United States Patent [19]

Pilachowski et al.

[11] 3,736,020

[45] May 29, 1973

[54] ENERGY ABSORBING SEAT FOR SNOWMOBILES

[75] Inventors: Martin Thomas Pilachowski; Larry F. Stikeleather; Donald J. Zach, all of Milwaukee, Wis.

[73] Assignee: Universal Oil Products Company, Des Plaines, Ill.

[22] Filed: July 26, 1971

[21] Appl. No.: 166,142

[52] U.S. Cl..................296/63, 180/5 R, 267/131, 297/195, 297/453
[51] Int. Cl................................................A47c 7/14
[58] Field of Search..................180/5 R; 296/63; 267/131, 132, 133; 297/180, 195, 208, 211, 214, 326, 328, 453; D14/24; D90/1, 16

[56] References Cited

UNITED STATES PATENTS

| 962,443 | 6/1910 | Loudenclos | 267/132 |
|---|---|---|---|
| 2,680,472 | 6/1954 | Hempe | 267/132 X |
| 3,188,665 | 6/1965 | Snyder | 297/DIG. 1 |
| 1,961,145 | 6/1934 | Harley et al. | 297/211 X |
| 2,702,088 | 2/1955 | Klimek | 180/5 R |

FOREIGN PATENTS OR APPLICATIONS

| 1,816,274 | 6/1970 | Germany | 180/5 R |

OTHER PUBLICATIONS

Evinrude Trailblazer advertisement, Evinrude Motors, Received in Patent Office May 21, 1971
Moto-ski advertisement, Moto-ski Limited, Received in Patent Office May 21, 1971

*Primary Examiner*—Leo Friaglia
*Assistant Examiner*—Leslie J. Paperner
*Attorney*—James R. Hoatson, Jr. and Barry L. Clark

[57] ABSTRACT

Snowmobile seat has relatively firm, damped cushion mounted on a base member which is pivoted at its front end to the snowmobile chassis. The rear end of the base member is supported above the chassis by a pair of rearwardly and downwardly extending shock absorbers which are attached at their lower ends to a rigid saddle strap bracket which spreads the load over a large area of the chassis. The shock absorbers are surrounded by springs which are preloaded so as not to be compressed by the static weight of an average operator. The shock absorber means cooperate with the springs and damped cushion to greatly reduce shock loads transmitted to the operator as a result of hard bounces of the vehicle. By preloading and positioning the linear springs so as to face rearwardly at an angle to the vertical, a far greater amount of energy can be absorbed by a given amount of vertical seat deflection and a maximum allowable vertical spring force than if the springs were vertical, since the linear springs are loaded in a non-linear manner which causes them to function somewhat as a constant force spring.

15 Claims, 5 Drawing Figures

Patented May 29, 1973
3,736,020
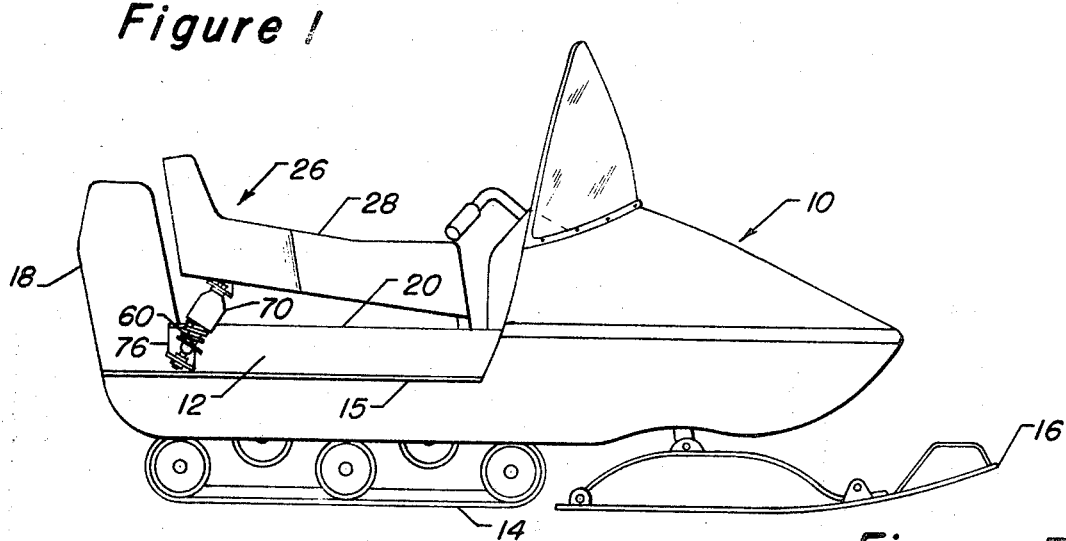
Figure 1
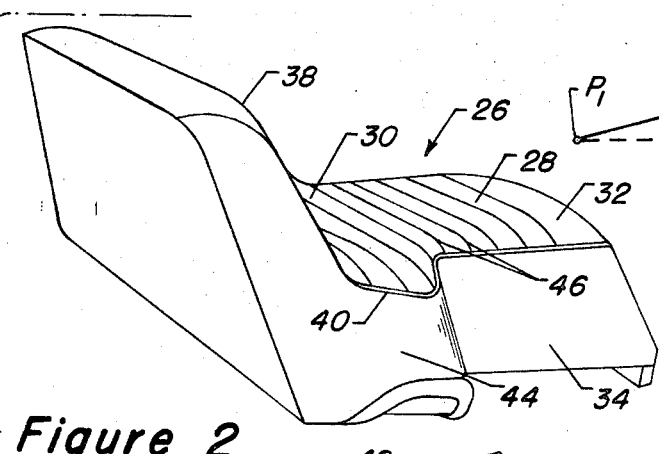
Figure 2
Figure 3
Figure 4
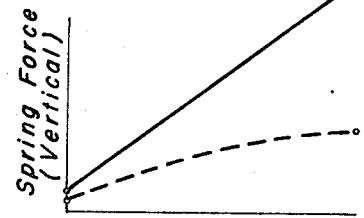
Figure 5
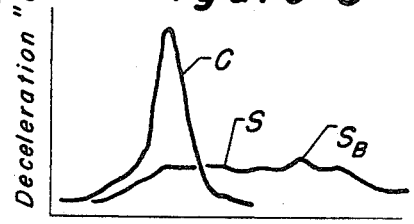
INVENTORS:
Martin T. Pilachowski
Larry F. Stikeleather
Donald J. Zach
BY: James R. Hoatson, Jr.
Barry L. Clark
ATTORNEYS

ENERGY ABSORBING SEAT FOR SNOWMOBILES

BACKGROUND OF THE INVENTION

During recent years, snowmobiles have become extremely popular. They have also been considered to be responsible for a considerable number of injuries to the spines of operators who have not realized that very large "G" deceleration forces, often in excess of 20–30 G's, can be transmitted to the operator's spine through their seat cushions when they bounce or are intentionally jumped on hard frozen ground or land on a road surface after passing over a snowbank. Although thick, soft cushioned seats are comfortable when traveling over smooth surfaces, they cannot absorb the energy of hard bounces. In fact, a study has shown that many of them will not even support the static weight of a moderately heavy rider without bottoming. The subject of injuries, as they relate to snowmobile seat construction, is discussed at length in a paper entitled "Biomechanics of Snowmobile Spine Injuries" by Verne L. Roberts Ph.D. and Robert P. Hubbard, Ph.D., Highway Safety Research Institute, the University of Michigan, Ann Arbor, 1971.

Since jolting rides are not unique to snowmobiles, one might expect that a motorcycle seat suspension or a tractor seat suspension, such as shown in U.S. Pat. Nos. 3,116,089 and 2,680,472, respectively, might be usable. In actuality, such suspensions would not be practical for a snowmobile since they are designed to place the operator in a ride zone wherein the spring means is compressed by the static weight of the rider and will support him as he bounces either up or down. In a snowmobile, wherein much greater jolts can be expected, it is not practical to provide a ride zone, since, in order to keep the operator as close to his machine as possible, the seat should have a minimum of vertical travel while to absorb the most energy there should be as much travel as possible. Since the vehicle's drive track requires considerable vertical clearance and is very close to the chassis, the springs cannot be positioned under the seat, as in the aforementioned patents, without causing the operator to ride too high or reducing the seat's capability of dissipating energy. Since a snowmobile chassis is formed of relatively thin gauge metal, a spring arrangement positioned under the seat might also concentrate too much force in a small area and cause deformation of the chassis. A detailed explanation of the factors involved in causing injury when a seat is subjected to rapid decelerations by the impact of a crash and of an ideal type of apparatus for absorbing a maximum of energy in a minimum time and over a minimum distance in order to prevent spinal injuries is set forth in U.S. Pat. No. 2,953,189.

SUMMARY OF THE INVENTION

It is an object of this invention to provide a snowmobile seat having a cushion which comfortably supports the operator when traveling over the usual terrain covered by such vehicles but which is supported by an energy absorbing suspension which can absorb extremely high "G" forces and reduce them to a level which will substantially reduce, if not eliminate, the chance of injury to the spine of an operator.

It is a further object of this invention to provide a suspension seat for a snowmobile which will absorb a large amount of energy in a minimum distance of vertical travel of the seat and without requiring the use of any space between the seat and chassis for the movable parts of the suspension mechanism.

It is an additional object of this invention to provide a suspension seat for a snowmobile wherein the suspension members are positioned outside the area in which the operator places his legs and wherein the seat is shaped so as to maintain the rider in the correct position for maximum energy absorption.

It is a still further object of this invention to provide a suspension seat and mounting arrangement which may be adapted to existing snowmobiles having chassis of a gauge too thin to support a seat suspension by direct attachment.

These objects are attained by the present invention wherein an elongated highly damped cushion member, preferably filled with a resilient foam material and covered by a touch weatherproof cover, is affixed to a support member such as a piece of plywood. The support member is hingedly pivotally mounted at its forward end to the vehicle chassis by means of a plurality of fasteners. A pair of shock absorbers, surrounded by coil springs which are preferably given an initial pre-load, are pivotally affixed to the underside of the support member at its side edges and near the rear end thereof as close to the center of gravity of a seated occupant as possible. The shock absorbers and springs extend downwardly and rearwardly from the seat to a point where they are pivotally attached to the flanged ends of a heavy gauge support bracket. The bracket has an upside down U-shaped central portion which straddles the vehicle chassis and is in contact therewith over a relatively wide area. The bracket is thus able to transfer the load applied at the flanges to the chassis over a large area so as not to deform it.

The two springs preferably each have a linear spring constant of about 50 pounds per inch and a 75 pound preload so that no portion of the approximately 5 inch distance between the underside of the cushion support member and the chassis is required to provide static support for an operator weighing 180 pounds or less whose center of gravity is about 2 inches forward of the springs, and is thus fully available for absorbing energy of impacts. By mounting the springs so as to face rearwardly at an angle to the vertical, the effective (vertical) load characteristics of the linear springs are non-linear in a force limiting manner such that the slope of the force-deflection curve approaches zero in the limit; somewhat like a constant force spring which would be ideal for shock isolation. Since the springs pivot toward the horizontal as the vertical deflection force is transmitted to them from the seat, their axial deflection becomes less and less for each increment of vertical deflection of the seat. The springs are thus able to absorb much more energy for a given amount of seat deflection and for a given maximum amount of allowable vertical component of spring force than if they were vertical.

The foregoing and other objects, features and advantages will be apparent from the following more particular description of a preferred embodiment thereof, as illustrated in the accompanying drawings.

BRIEF DESCRIPTION OF THE DRAWINGS

FIG. 1 is a side plan view showing the energy absorbing seat of the present invention installed on a snowmobile;

FIG. 2 is an exploded perspective view showing the various parts of the seat;

FIG. 3 is a schematic diagram illustrating the movement of the seat and suspension system relative to each other during deflection of the seat;

FIG. 4 is a graphical representation of the vertical component of spring force versus vertical seat deflection for a given spring positioned at the angle to the seat shown in FIG. 3 as compared to being positioned vertically; and FIG. 5 shows graphical representations of typical deceleration forces acting on a seat occupant versus time during impact of the occupant when the occupant is supported only by a cushion and when he is supported by a cushion and the suspension system of the invention.

DESCRIPTION OF THE PREFERRED EMBODIMENT

In FIG. 1, the energy absorbing snowmobile seat is shown installed on a snowmobile indicated generally at 10. The snowmobile 10 includes a chassis tunnel 12 which covers and protects the operator from the drive track mechanism 14. The lower end of the chassis tunnel 12 is flanged outwardly so as to form a foot rest portion 15 for use by the driver of the vehicle and any passengers. The front end of the snowmobile supports a steering mechanism comprising a pair of skis 16 while the rear end supports a gasoline tank and/or storage compartment 18.

Mounted to the top surface 20 of the chassis tunnel 12 is an elongated cushion member 26 having a top surface 28, a rearward seating portion 30 and an upwardly angled front portion 32 which is narrower at its top than at its bottom due to its having tapered sides 34. The tapering of the sides make it comfortable for the driver of the vehicle to stand on the flanges 15 with his legs in a normal position rather than having to position them in a bow-legged fashion as would be necessary if the sides were vertical. The back portion 38 of the seat extends upwardly from the seating portion 30 and forms a back rest for an occupant of the seat which insures that the occupant of the vertically pivotable seat 26 cannot make bodily contact with the rear gas tank portion 18 of the snowmobile during large deflections of the seat. The back portion 38 and the rearward seating portion 30 of the seat are wider than the front portion 32 of the seat due to the rear extension portions 40 which extend outwardly for a purpose to be described. A cover member 44, which is preferably formed of weatherproof plastic such as vinyl is shown as having been made by being cut and sewn along seams 46. The lower portions of the cover 44 are used to anchor the cushion 26 to the cushion support 48 which is preferably made of plywood. The cushion support member 48 contains a pair of shock absorber mounting holes 50 which underlie the rear side extension portions 40.

A double hinge member 54 having upper hinge portions 56 and lower hinge portions 58 is adapted to be fastened by means of a number of holes to the front edge of the cushion support member 48 and to the top surface 20 of the chassis tunnel 12. Although the hinge member 54 may be formed in one piece it is shown as being in two pieces to accommodate the gasoline line (not shown) which carries fuel from the tank 18 to the engine (not shown) at the front end of the snowmobile. For convenience, this gas line is often placed on the top surface 20 of the chassis tunnel 12.

A pair of shock absorbers 60 have upper fastener members 62 which serve to anchor the shock absorbers to the cushion support member 48 through shock absorber mounting holes 50. A fastener member 64 at the lower end of the shock absorber 60 anchors the lower end of the shock absorber relative to the chassis 12 in a manner to be hereinafter described. A coil spring 66 is mounted concentrically about each of the shock absorbers 60 and abuts against a flange (not shown) at the upper end of the shock absorber. The lower end of the spring 66 abuts against a flange member 68 which is fixed relative to the lower end of the shock absorber 60. The flange members are preferably spaced from each other and relative to the length of springs 66 so as to place a preload on each of the springs equal to about 75 pounds. This is sufficient preload to support about one half of the weight of an 180 pound average operator seated about 2 inches forwardly of the mounting holes 50. If desired, one of the flanges could be adjustably positioned to permit the preload to be varied. Together, the springs 66 are preferably preloaded to support the entire weight of an operator so that when the snowmobile 10 is at rest the cushion support member 48 will not be deflected downwardly and will thus retain its entire deflection range for the absorption of impacts experienced by the vehicle during movement. Lesser preloading would make the cushion slightly more comfortable under minor bouncing conditions while considerably reducing the suspension's ability to withstand large bounces. Greater preloading would provide greater protection to the rider against excessive "G" forces at the penalty of a poorer ride under light bounce conditions. Since the chassis tunnel 12 and the foot rest flanges 15 on most snowmobiles are formed of metal of a relatively thin gauge which is too weak to support extremely heavy loading in a small area, a very heavy gauge relatively wide, generally U-shaped strap bracket 76 is provided for supporting the lower ends of the springs 66 and shock absorbers 60. A flexible dust sleeve 70 covers the shock absorber 60 and spring 66 to prevent foreign material from contacting the sliding parts of the shock absorber. A plurality of holes 78 formed in the strap bracket 76 permit the bracket to be fastened to the top surface 20 of the chassis tunnel 12 at several locations. A pair of legs 82 extend downwardly from the top of the bracket 76 to as to straddle the chassis tunnel 12 while outwardly extending bracket flanges 84 at the ends of the legs 82 provide anchoring points for the lower ends of shock absorbers 60. It will be obvious that the relatively wide and thick strap bracket 76 will function to distribute the extremely high small area loading which the shock absorbers 60 place on the bracket flanges 84 over a large area of the top surface 20 of the chassis tunnel.

In order to provide a maximum amount of cushion depth for absorbing impacts of the occupant against the seat or the seat against the occupant caused by bouncing of the vehicle, the cushion is preferably approximately 5 inches thick at the point on seating surface 30 where the occupant should sit so that his center of gravity is centered between the upper ends of the shock absorbers 60. The front portion 32 of the seat is preferably much thicker since it is angled relative to the seating surface 30 to prevent the occupant from sliding forward by gravity during ordinary operation of the vehicle when the suspension is undergoing little deflection. Although the cushion 26 should be soft enough to be comfortable during extended rides it should not be so soft that the seat occupant will bottom against the support member 48 when the vehicle is bouncing lightly. To help provide the cushion 26 with the desirable property of being soft for light bounces and fairly stiff for hard ones, the filler material of the cushion is preferably made of a dense foam material which is highly damped. Since damping is provided by limiting the escape of air from the depressed cushion, the cover material 44 should preferably be impervious to the passage of air. It has been found that the air passages which are formed in the seams 46 by the operation of sewing the cushion 26 provides a desirable amount of damping. Where the cover 44 is made of a vacuum formed or other seamless type of cover material, a small vent may be positioned in the front of the cushion to provide damping approximately equal to that attained with a cut and sewn cushion. Where the interior of the cushion is not filled with foam, but contains, for example, an air bag or a liquid filled bladder, it is desirable that the equivalent linear damping coefficient be at least 5 lbs/sec/in but not more than 10 pounds/sec/in.

FIG. 3 shows a diagrammatic representation of the pivotal movement of the cushion support member 48, spring 66 and shock absorber 60 during deflection of the seat cushion 26. Line $L_c$ represents the length of cushion support member 48 between pivot point $P_1$ where it is hinged to the snowmobile chassis 12 by hinge 54 and pivot point $P_2$ where it is pivotally attached to the shock absorber 60 at hole 50. Line $L_s$ represents the effective length of the shock absorber 60 between pivot point $P_2$ and pivot point $P_3$ where the shock absorber is attached to the bracket flange 84. Obviously, the length $L_s$ of the shock absorber 60 decreases as the cushion 26 is deflected by an occupant during impacts. Since the spring 66 is held against movement relative to the two movable casing members of the shock absorber 60 it is also obvious that any reduction in the length of the shock absorber as represented by line $L_s$ will result in an identical reduction in the length of the spring 66. In FIG. 3, the axis of the shock absorber and spring, which lies on line $L_s$, is shown as being at an angle $\theta$ which is approximately 56° to the horizontal. Although angle $\theta$ could be close to 90° without causing any substantial reduction in the usable space available for the operator's feet on the foot rest flange members 15, it is desirable that the angle $\theta$ not substantially exceed 60°. Such an angular positionment will result in the axial deflection (change in length of $L_s$) of the springs 66 being less than the vertical deflection (distance $P_2 P'_2$) of the seat. As the seat approaches its maximum vertical deflection, as shown by the dotted line location of line $L_c$ in FIG. 3, the corresponding incremental movements of the spring 66 along its axis will be considerably less than they were at the beginning of the deflection of the seat. Thus, the springs tend to act like constant force springs which absorb more energy for a maximum allowable amount of spring force and a given amount of seat deflection than if they were mounted vertically.

In FIG. 4, the dotted line curve represents the vertical component of spring force for varying degrees of vertical deflection of the seat. Since the area under the curve represents the energy stored by the spring during loading, it is readily evident that for a given maximum vertical component of spring force the area under the dotted line curve is much greater than the area under the solid line curve which represents the identical spring mounted vertically. Although one might consider using a vertically mounted spring having a lower spring rate such that the spring force after full deflection of the seat would be identical to that of the spring represented by the dotted line curve, such a spring would obviously have to be compressed substantially further than the spring represented by the dotted line curve in order to achieve the preload desired. Obviously, there are very real physical limitations to the distance a spring can be compressed by preloading and during anticipated use. Furthermore, even if a spring were used vertically which has the same maximum spring force after 5 inches of deflection and the same initial preload as the angled spring described herein, it would not store as much energy as the angled spring shown since the angularly mounted spring approaches the characteristics of a constant force spring as can be seen at the righthand side of FIG. 4 where the dotted curve becomes generally horizontal. A comparison of the areas under the two curves shows that the angled spring mounting arrangement stores approximately 65 percent as much energy as an identical vertically mounted spring while exerting only 50 percent as much spring force. For the same maximum common vertical component of spring force the area under the dotted line curve is approximately 188 percent larger than the area under the straight line curve and thus, the energy absorbed is 188 percent greater.

The shock absorbers 60 perform the conventional function of dissipating energy by converting the relative kinetic energy of the man and the machine at the time of an impact into heat at a controlled rate. When the man falls in the seat or when the seat and machine are driven upward against the man the shock absorbers are compressed and a viscous fluid is throttled between chambers internal to the shock absorbers. The shock absorbers 60 prererably have a force limit control type of construction which limits their force to approximately 500 pounds each when the compression velocity is higher than 100 inches per second. This force limit restricts the amount of deceleration of the occupant of the snowmobile relative to the machine at the time of an impact so as to prevent the transmission to the man of forces high enough to cause injury.

FIG. 5 graphically compares the deceleration forces (in Gs) acting on a seat occupant versus time during impact for a 5 inch thick snowmobile cushion without the suspension disclosed herein (curve C) and with the suspension disclosed herein (curve S). The particular curves shown represent a 31 inch drop of a 150 pound mass. Whereas the peak deceleration shown in curve C is 33 gs, the peak deceleration of curve S is only 9.6 gs. It can be seen that the cushion without the suspension bottoms almost immediately while the cushion with the suspension does not bottom until point $S_B$ on curve S.

I claim as my invention:

1. An energy absorbing seat for a snowmobile comprising a relatively thick, highly damped cushion, a cushion support member adapted to be hingedly pivoted at its front end to the chassis of a snowmobile, suspension means comprising at least two shock absorbers and springs supported at one end by the rearward portion of said cushion support member and having their opposite ends directed rearwardly and downwardly and adapted to be affixed relative to the chassis of a snowmobile so as to permit a substantial downward movement of said cushion support member relative to said chassis, said springs being pre-loaded sufficiently to carry all or at least most of the static weight of an average operator on said cushion without deflection of said cushion support member.

2. The energy absorbing seat of claim 1 wherein the rearward portion of said cushion includes integral outwardly extending portions on each side of said seat, said suspension means being affixed to the bottom of said cushion support member under said outwardly extending portions.

3. The energy absorbing seat of claim 1 wherein said suspension means is affixed to said chassis by a wide bracket member that straddles and is supported by the chassis over a large area of contact and has side flange portions extending outwardly from said chassis to support said opposite ends of said shock absorbers and springs.

4. The energy absorbing seat of claim 3 wherein said cushion is at least four inches thick above said cushion support member and is of increased thickness at its front and rear portions, said cushion having its sides tapered upwardly at its front portion so that it is of lesser width at its top than on its bottom, said cushion and cushion support member being of substantially increased width at said rearward portion so as to overlie said shock absorbers and springs, said springs surrounding said shock absorbers and being affixed to the relatively movable parts thereof.

5. The energy absorbing seat of claim 1 wherein the forward portion of the cushion above the cushion support member has an increasing thickness in a forward direction from the center of said cushion support member.

6. The energy absorbing seat of claim 5 wherein at least the forward portion of said cushion has tapered side walls which decrease in thickness in an upward direction.

7. The energy absorbing seat of claim 1 wherein said cushion is at least four inches thick above said cushion support member and covered with a plastic covering, said cushion containing damping means providing a linear damping coefficient of 5–10 pound/second/inch.

8. The energy absorbing seat of claim 7 wherein said cushion is filled with an expanded foam material, said damping being provided by air escaping through said cover during deflection of said foam.

9. The energy absorbing seat of claim 8 wherein said cover is cut and sewn from air tight plastic, said air escapement taking place through the seams.

10. The energy absorbing seat of claim 8 wherein said cover is formed of an airtight plastic having no seams, said air escapement taking place through vent means positioned in said cover.

11. The energy absorbing seat of claim 1 wherein said springs are positioned about the exterior of said shock absorbers.

12. The energy absorbing seat of claim 11 wherein each of said springs is preloaded with approximately 75 pounds of force.

13. The energy absorbing seat of claim 11 wherein each of said springs has a spring rate of approximately 50 pounds per inch.

14. The energy absorbing seat of claim 11 wherein each of said shock absorbers include force limiting means which limit their force to a maximum of approximately 500 pounds.

15. The energy absorbing seat of claim 11 wherein said shock absorbers and springs extend rearwardly and downwardly at an angle of approximately 56° to the horizontal when the seat is mounted on a snowmobile positioned on a horizontal surface.

* * * * *